A. INGALLS.
Grain-Drill.
No. 38,485
Patented May 12, 1863.
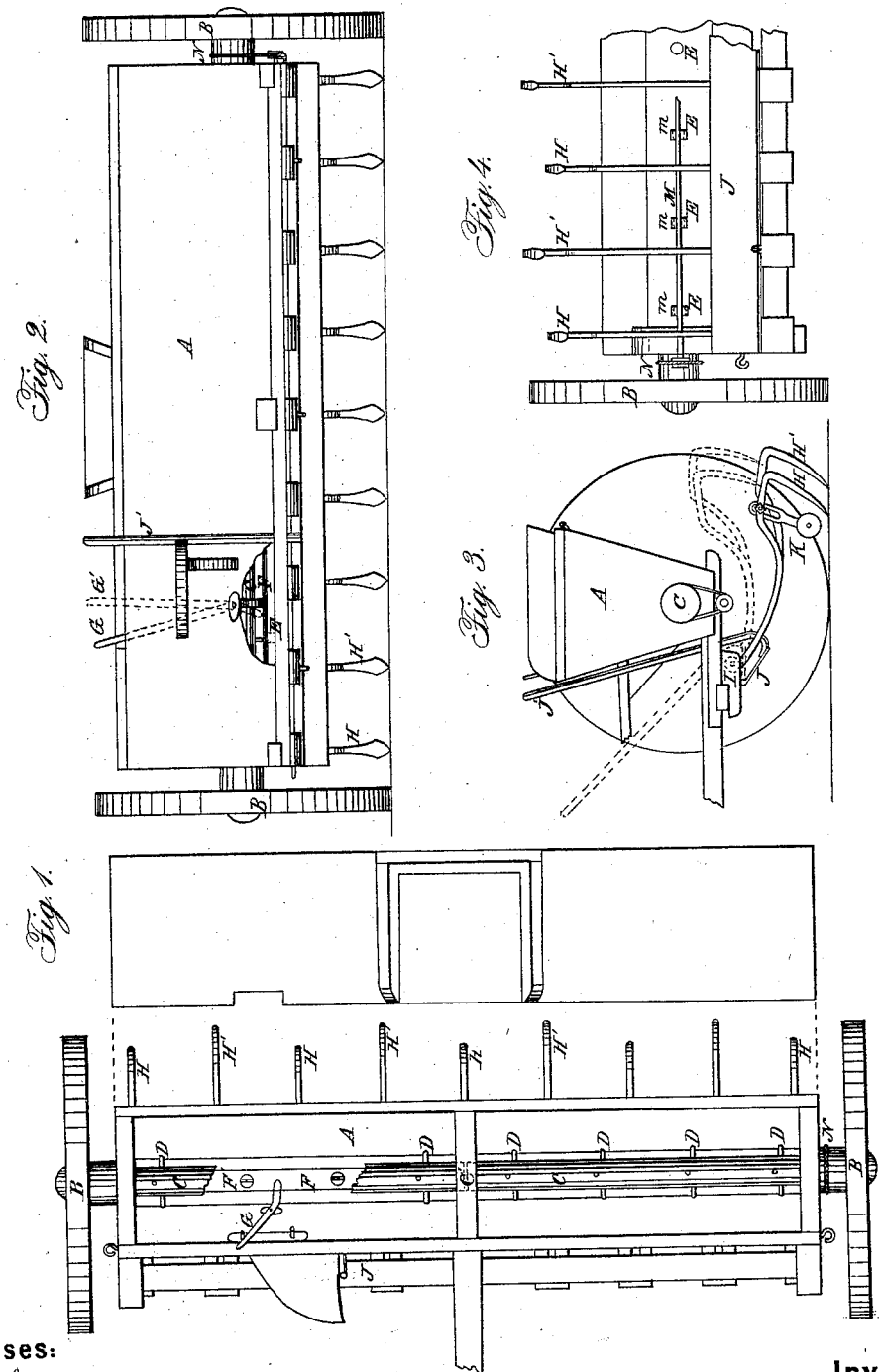

UNITED STATES PATENT OFFICE.

A. INGALLS, OF INDEPENDENCE, IOWA.

IMPROVEMENT IN GRAIN-DRILLS.

Specification forming part of Letters Patent No. 38,485, dated May 12, 1863.

*To all whom it may concern:*

Be it known that I, A. INGALLS, of Independence, in the county of Buchanan and State of Iowa, have invented new and useful Improvements in Combined Seeding-Machines and Cultivators; and I do hereby declare that the following is a full and complete description of the construction and operation of the same, reference being had to the accompanying drawings, making part of this specification, in which—

Figure 1 is a top view. Fig. 2 is a front view. Fig. 3 is an end view, and Fig. 4 is a view of the under side.

My invention relates to a combined seeding-machine and cultivator so constructed and arranged that it can be used at pleasure for either purpose for which it is designed—that is, for seeding or for cultivating the ground, for sowing broadcast, or distributing plaster.

A represents the box or hopper which contains the grain or substance to be sown; and B represents the wheels, each wheel being fast to its own axle-tree C. These axle-trees meet at the center of the hopper, as shown at C'. It hence follows that when the wheels turn the axles turn also. The axle-trees lie in the bottom and narrow part of the hopper, and are provided with radial pins D for the purpose of agitating the grain to insure its regular discharge. Along the bottom of the hopper is a series of openings, E, for the discharge of the seed. These openings are covered by a slider, F, having similar openings, F', at the same distances apart, by which means the openings E can be in part or wholly closed at pleasure by the movement of the lever G, as indicated at G' in Fig. 2. In this manner the quantity of seed sown can be regulated.

H H' represent a series of cultivator-teeth, the arms of which articulate at I upon a rod or pins passing through the head of each arm. These teeth are arranged between and outside of the openings E, and the arms of every alternate tooth is longer than the other, as shown in Fig. 1, for the purpose of more effectually covering the grain.

Immediately below the point of articulation at I is attached by hinges a plate or rod, J, beneath the arms of the teeth H H', which plate or rod is provided with a lever, J', by means of which the whole of the teeth can be raised from the ground at pleasure to avoid obstructions or to pass to and from the field.

K represents a gage-wheel, which can be adjusted by means of the slot in its arm, (shown at L,) so as to allow the tooth to which it is attached to enter the ground any desirable distance. These gage-wheels are to be attached to each cultivator-tooth.

For the purpose of more thoroughly scattering the seed broadcast I provide a revolving rod, M, which extends along beneath the openings E, and to this rod, below each opening, is secured a flat plate of metal, $m$, about the size of the opening. This shaft is caused to revolve by means of a band, N, around one axle-tree, C, and around a pulley upon the end of the rod M. The seeds, as they fall through the openings E, are thus scattered upon the ground broadcast.

What I claim as my improvement, and desire to secure by Letters Patent, is—

The revolving axles C, rod M, and plates $m$, the lifting-plate J, and gage-wheels K, when all these parts are constructed, arranged, and operated as and for the purpose herein set forth.

A. INGALLS.

Witnesses:
 I. M. CHANDLER,
 P. A. OLDER.